(12) United States Patent
Liu et al.

(10) Patent No.: US 11,370,701 B2
(45) Date of Patent: Jun. 28, 2022

(54) SOLAR CONTROL FILM WITH IMPROVED MOISTURE RESISTANCE FUNCTION AND MANUFACTURING METHOD THEREOF

(71) Applicant: Institute of Nuclear Energy Research, Atomic Energy Council, Executive Yuan, Taoyuan (TW)

(72) Inventors: Yung-Ching Liu, Taoyuan (TW); En-Shih Chen, Taoyuan (TW); Cheng-Chang Hsieh, Taoyuan (TW)

(73) Assignee: Institute of Nuclear Energy Research, Atomic Energy Council, Executive Yuan, Taoyuan (TW)

( * ) Notice: Subject to any disclaimer, the term of this patent is extended or adjusted under 35 U.S.C. 154(b) by 0 days.

(21) Appl. No.: 17/366,010

(22) Filed: Jul. 1, 2021

(65) Prior Publication Data
US 2022/0127188 A1 Apr. 28, 2022

(30) Foreign Application Priority Data
Oct. 28, 2020 (TW) .................................. 109137506

(51) Int. Cl.
| | |
|---|---|
| B32B 15/04 | (2006.01) |
| B32B 17/06 | (2006.01) |
| C03C 17/36 | (2006.01) |
| C03C 17/42 | (2006.01) |
| C23C 28/00 | (2006.01) |
| C03C 17/38 | (2006.01) |

(52) U.S. Cl.
CPC ........ *C03C 17/366* (2013.01); *C03C 17/3639* (2013.01); *C03C 17/3644* (2013.01); *C03C 17/3647* (2013.01); *C03C 17/3681* (2013.01); *C03C 17/38* (2013.01); *C03C 17/42* (2013.01); *C23C 28/321* (2013.01); *C23C 28/3455* (2013.01)

(58) Field of Classification Search
CPC .......................... C03C 17/3647; C03C 17/367
USPC ................................ 428/426, 428, 432, 434
See application file for complete search history.

(56) References Cited

U.S. PATENT DOCUMENTS

| | | | |
|---|---|---|---|
| 7,241,506 B2 * | 7/2007 | Hartig | C03C 17/366 428/428 |
| 2002/0140885 A1 * | 10/2002 | Ueno | G02F 1/133553 349/113 |

(Continued)

*Primary Examiner* — Lauren R Colgan (57) ABSTRACT

A solar control film with improved moisture resistance function is provided. The solar control film includes a flexible substrate, at least one infrared-reflective composite layer and an outer dielectric layer. The infrared-reflective composite layer includes a dielectric sublayer and a metal sublayer. The dielectric sublayer is disposed on the flexible substrate, and the material of the dielectric sublayer includes $TiO_2$. The metal sublayer is disposed on the dielectric sublayer, and includes 8.3-16.4 atomic % Ag, 0.5-1.0 atomic % Ti, 81.0-90.9 atomic % N, and 0.3-0.6 atomic % noble metal, and the noble metal is Au, Pd or any combinations thereof. The outer dielectric layer is disposed on the infrared-reflective composite layer, and the material of the outer dielectric layer includes $TiO_2$. In this way, the provided solar control film can effectively suppress of forming white spots without significantly sacrificing its original function and characteristics.

19 Claims, 9 Drawing Sheets

(56) References Cited

U.S. PATENT DOCUMENTS

2003/0049464 A1* 3/2003 Glenn ................ C03C 17/36
  428/432
2008/0138547 A1* 6/2008 Maschwitz ......... C03C 17/3639
  427/160

* cited by examiner

SOLAR CONTROL FILM WITH IMPROVED MOISTURE RESISTANCE FUNCTION AND MANUFACTURING METHOD THEREOF

CROSS REFERENCES TO RELATED APPLICATION

This application claims priority of Taiwanese Patent Application No. 109137506 filed on Oct. 28, 2020, the entire content of which is hereby incorporated by reference.

FIELD OF TECHNOLOGY

The invention relates to a solar control film and manufacturing method thereof, particularly, a solar control film with improved moisture resistance function and manufacturing method thereof.

BACKGROUND

A solar control film (also called infrared reflective film) has characteristics such as high transmittance of visible light, transparent appearance, and good lighting; at the same time, it also has high reflectivity to mid- and far-infrared rays (such as in the sunlight) and thus is good at shielding heat. Therefore, the solar control film is often applied to glass or films of doors and windows of vehicles or buildings.

However, when a solar control film comprising a metal sublayer containing silver (Ag) is exposed to a humid environment, the solar control film's edges or corners will gradually form white spots, for example. Thus, the white spots may further increase the roughness between the solar control film layers and even result in cleavage or cracking of the layers. These conditions resulted from moisture or humidity will also cause the incident sunlight on the solar control film to scatter, which will prevent the solar control film from successfully and effectively reflecting the sunlight, so should avoid these conditions.

Therefore, effectively suppressing the white spots to form on the solar control film when the solar control film is exposed to a humid or moisture environment is a problem to be solved in this field.

SUMMARY

To solve the above problem, a solar control film is provided. The solar control film can be applied to household or car glass due to its light transmission characteristics and infrared-ray reflection.

According to an embodiment of this invention, the structure of the solar control film, from bottom to top, sequentially comprises a flexible substrate, a first infrared-reflective composite layer comprising a first dielectric sublayer and a first metal sublayer, and an outer dielectric layer, for example. The material of the first dielectric sublayer comprises titanium oxide ($TiO_2$). The material of the outer dielectric layer comprises titanium oxide ($TiO_2$). The material of the first metal sublayer comprises silver (Ag), a noble metal, titanium (Ti), and nitrogen (N), and the noble metal may be gold (Au), palladium (Pd), or any combinations thereof. Specifically, the material of the first metal sublayer comprises 8.3-16.4 atomic % Ag, 0.5-1.0 atomic % Ti, 81.0-90.9 atomic % N, and 0.3-0.6 atomic % noble metal.

According to another embodiment of this invention, the first infrared-reflective composite layer may further comprise a first protection layer on the first metal sublayer. The material of the first protection layer may comprise titanium (Ti), titanium nitride (TiN), aluminum-doped zinc oxide (AZO), or any combinations thereof.

According to yet another embodiment of this invention, the structure of the solar control film may further comprise a second infrared-reflective composite layer disposed between the first infrared-reflective composite layer and the outer dielectric layer. Similarly, the second infrared-reflective composite layer may also comprise a second dielectric sublayer and a second metal sublayer. The material of the second dielectric sublayer comprises $TiO_2$. The material of the second metal sublayer comprises Ag, a noble metal, Ti, and N, and the noble metal may be Au, Pd, or any combinations thereof. Specifically, the material of the second metal sublayer comprises 8.3-16.4 atomic % Ag, 0.5-1.0 atomic % Ti, 81.0-90.9 atomic % N, and 0.3-0.6 atomic % noble metal.

According to yet another embodiment of this invention, the second infrared-reflective composite layer may further comprise a second protection layer on the second metal sublayer. The material of the second protection layer may comprise Ti, TiN, AZO, or any combinations thereof.

According to still another embodiment, the solar control film may further comprise an encapsulation layer disposed on the outer dielectric layer.

Moreover, a method of manufacturing the solar control film above is further provided. The method comprises the following steps. First, a first dielectric sublayer is deposited on a flexible substrate, and the material of the first dielectric sublayer may be $TiO_2$. Then, a first metal sublayer is deposited on the first dielectric sublayer, and the material of the first metal sublayer comprises 8.3-16.4 atomic % Ag, 0.5-1.0 atomic % Ti, 81.0-90.9 atomic % N, and 0.3-0.6 atomic % noble metal comprising Au, Pd, or any combinations thereof. Subsequently, a first protection sublayer is deposited on the first metal sublayer, and the material of the first protection sublayer may be Ti, TiN, AZO, or any combinations thereof. Next, an outer dielectric layer is deposited on the first protection sublayer, and the material of the outer dielectric layer may be $TiO_2$.

According to yet another embodiment, the method may further comprise depositing a first protection layer on the first metal sublayer before the step of depositing the outer dielectric layer. The material of the first protection sublayer may be Ti, TiN, AZO, or any combinations thereof.

According to another embodiment, the following steps may be further included between depositing the first protection layer and the outer dielectric layer. A second dielectric sublayer is deposited on the first protection sublayer, and the material of the second dielectric sublayer may be $TiO_2$. Subsequently, a second metal sublayer is deposited on the second dielectric sublayer, and the material of the second metal sublayer comprises 8.3-16.4 atomic % Ag, 0.5-1.0 atomic % Ti, 81.0-90.9 atomic % N, and 0.3-0.6 atomic % noble metal comprising Au, Pd, or any combinations thereof. Next, a second protection sublayer may be optionally deposited on the second metal sublayer, and the material of the second protection sublayer may be Ti, TiN, AZO, or any combinations thereof.

According to still another embodiment, the method further comprises forming an encapsulation layer on the outer dielectric layer.

Considering the foregoing, adding some components comprising Ti, N, and a noble metal (including Au, Pd, or any combinations thereof) to the Ag-containing metal sublayer can make the solar control film resist the moisture and prevent the agglomeration of Ag, and further achieve the effect of effectively suppressing the formation of white spots.

BRIEF DESCRIPTION OF THE DRAWINGS

In order to clearly illustrate the above and other objects, features, advantages and embodiments of the invention, the description of the attached drawings are provided as below.

DETAILED DESCRIPTION

In view of the unsolved problems, a solar control film comprising a flexible substrate, at least one infrared-reflective composite layer, and an outer dielectric layer is provided according to an embodiment of the invention. The infrared-reflective composite layer comprises a dielectric sublayer and an Ag-containing metal sublayer comprising noble metal, Ti, and N. The noble metal comprises Au, Pd, or any combinations thereof. Since the Ag-containing metal sublayer of the solar control film comprises the noble metal (such as Au or Pd), Ti, and N, the solar control film can thus resist the moisture and further suppress the formation of the white spots.

To more clearly illustrate the content of some embodiments of the invention, the embodiments will be illustrated with drawings as follows.

Figure 1A:
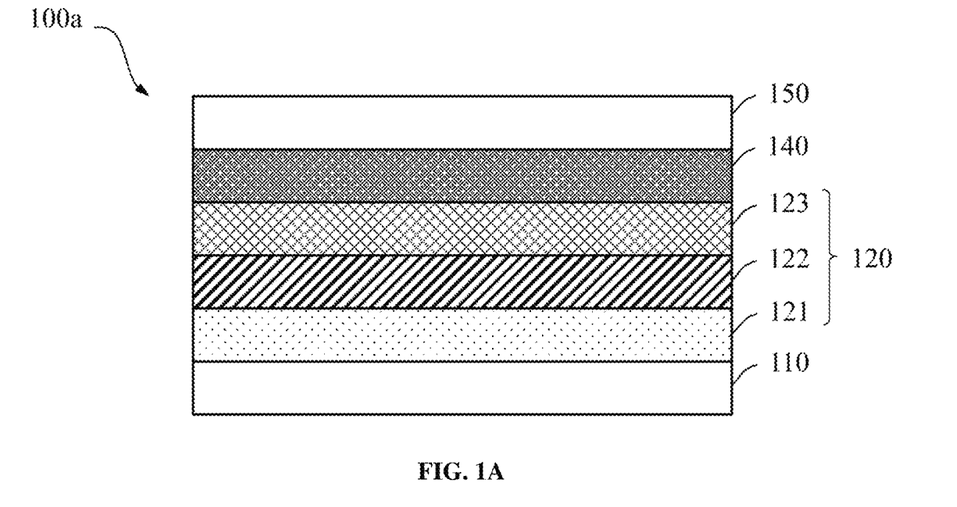
FIG. 1A is a cross-sectional structural diagram of a solar control film according to an embodiment of the invention

Referring to FIG. 1A, FIG. 1A is a cross-sectional structural diagram of a solar control film according to an embodiment of the invention. According to an embodiment of the invention, a solar control film 100a comprises a flexible substrate 110, a first infrared-reflective composite layer 120, an outer dielectric layer 140, and an encapsulation layer 150, from bottom to top.

The flexible substrate 110 may be a flexible resin film with good visible light transmittance (80% or more, for example). Further, since the solar control film 100a is required to be processed under a high temperature environment in the manufacturing process, the material of the flexible substrate 110 may be further selected from those materials of good heat resistance. The flexible substrate 110 may be polyethylene terephthalate (PET), polyethylene naphthalate (PEN), or polyether ether ketone (PEEK), for example. In addition, the thickness of the flexible substrate 110 is not particularly limited, and may be 10-500 μm, for example.

The first infrared-reflective composite layer 120 has the function of transmitting visible light and reflecting infrared rays. The infrared rays include near-infrared rays (NIR) and far-infrared rays (FIR). As shown in FIG. 1A, the first infrared-reflective composite layer 120 may comprise a first dielectric sublayer 121 and a first metal sublayer 122 in sequence from bottom to top. Optionally, as shown in FIG. 1A, the first infrared-reflective composite layer 120 may further comprise a first protection sublayer 123 disposed on the first metal sublayer 122 according to another embodiment of the invention.

The first dielectric sublayer 121 is disposed on the flexible substrate 110 to cooperate with the first metal sublayer 122 to control the reflection of visible light; at the same time, the first dielectric sublayer 121 may also protect against degradation of the first metal sublayer 122. In addition, the material of the first dielectric sublayer 121 may be a metal oxide with good visible light transmittance and good durability, such as $TiO_2$. Further, the thickness of the first dielectric sublayer 121 may be adjusted based on the refractive index, visible light transmittance, and infrared reflectance of its material, and it may be 15-70 nm, for example.

The first metal sublayer 122 is disposed on the first dielectric sublayer 121 to reflect the infrared rays. The essential metal component in the first metal sublayer 122 is Ag and also comprises Ti, N, and noble metals. In terms of the atomic percentage of elements, the content of Ag is 8.3-16.4 atomic %, the content of Ti is 0.5-1.0 atomic %, the content of N is 81.0-90.9 atomic %, and the content of the noble metals is 0.3-0.6 atomic %, for example. The noble metal may be Au, Pd, or any combinations thereof.

For example, the content of Ag in the first metal sublayer 122 may be 8.3, 8.5, 9.0, 9.5, 10.0, 10.5, 11.0, 11.5, 12.0, 12.5, 13.0, 13.5, 14.0, 14.5, 15.0, 15.5, 16.0, or 16.4 atomic %.

For example, the content of Ti in the first metal sublayer 122 may be 0.5, 0.6, 0.7, 0.8, 0.9, or 1.0 atomic %.

For example, the content of N in the first metal sublayer 122 may be 81.0, 81.5, 82.0, 82.5, 83.0, 83.5, 84.0, 84.5, 85.0, 85.5, 86.0, 86.5, 87.0, 87.5, 88.0, 88.5, 89.0, 89.5, 90.0, 90.5, or 90.9 atomic %.

For example, the content of the noble metal (such as Au, Pd, or any combinations thereof) in the first metal sublayer 122 may be 0.3, 0.35, 0.4, 0.45, 0.5, 0.55, or 0.6 atomic %.

Additionally, the thickness of the first metal sublayer 122 may be adjusted based on the refractive index, visible light transmittance, and infrared reflectance of the material of the first metal sublayer 122, and the thickness thereof may be 10-18 nm, for example.

The outer dielectric layer 140 is disposed on the first infrared-reflective composite layer 120. In addition, the function, material, and thickness of the outer dielectric layer 140 may be the same as those described in the example of the first dielectric sublayer 121, and therefore will not be described here in detail.

According to an embodiment of the invention, as shown in FIG. 1A, the first infrared-reflective composite layer 120 may further comprise a first protection sublayer 123. The first protection sublayer 123 is disposed on the first metal sublayer 122 to prevent the first metal sublayer 122 from damage in the subsequent manufacturing process. The material of the first protection sublayer 123 may be Ti, TiN, AZO, or any combinations thereof. Additionally, the thickness of the first protection sublayer 123 is not particularly limited, as long as the first protection sublayer 123 can protect the first metal sublayer 122, and the thickness thereof may be 1-3 nm, for example.

According to another embodiment, as shown in FIG. 1A, the solar control film 100a may further comprise an encapsulation layer 150. The encapsulation layer 150 is disposed on the outer dielectric layer 140 to encapsulate the solar control film 100a. In addition, the function, material, and thickness of the encapsulation layer 150 may be the same as those described in the example of the flexible substrate 110, and therefore will not be described here in detail.

Figure 1B:
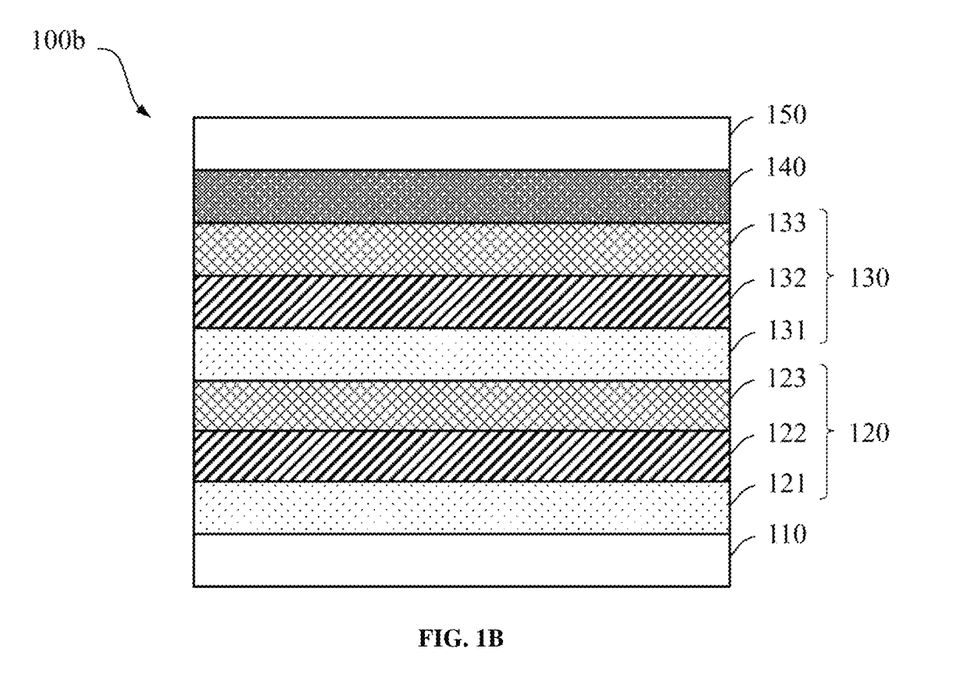
FIG. 1B is a cross-sectional structural diagram of another solar control film according to an embodiment of the invention.

Besides, another solar control film is provided according to another embodiment of the invention. Referring to FIG. 1B, FIG. 1B is a cross-sectional structural diagram of another solar control film according to an embodiment of the invention. Compared with the solar control film 100a in FIG. 1A, the solar control film 100b in FIG. 1B further comprises a second infrared-reflective composite layer 130 disposed on the first infrared-reflective composite layer 120.

The structure of the second infrared-reflective composite layer 130 may be the same as that of the first infrared-reflective composite layer 120. Namely, the second infrared-reflective composite layer 130 also comprises a second dielectric sublayer 131 and a second metal sublayer 132 (or may further comprise a second protection sublayer 133). In addition, the function, material and thickness of the second dielectric sublayer 131, the second metal sublayer 132, and the second protection sublayer 133 may be respectively the same as the examples of the first dielectric sublayer 121, the first metal sublayer 122, and the first protection sublayer 123, and therefore will not be described here in detail.

Figure 2A:
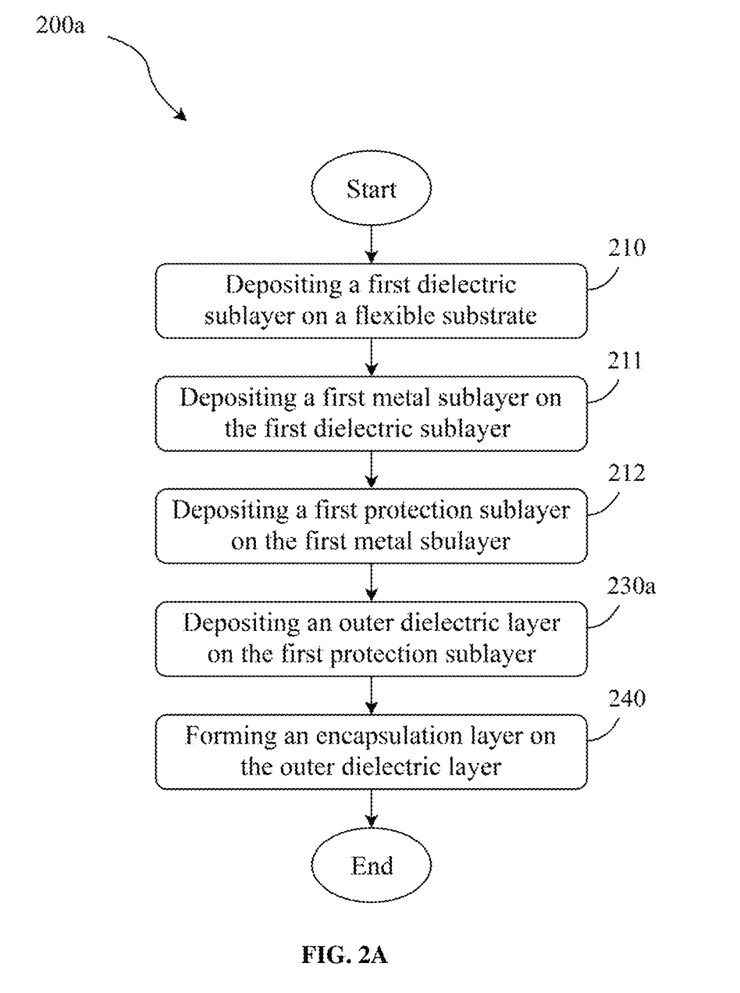
FIG. 2A is a flow chart of a method of manufacturing a solar control film according to an embodiment of the invention.

Besides the solar control films 100a, 100b, a method of manufacturing solar control films 100a, 100b are further provided according to an embodiment of the invention. Referring to FIG. 2A, FIG. 2A is a flow chart of a method of manufacturing a solar control film according to an embodiment of the invention. According to an embodiment of the invention, the manufacturing method 200a is used to manufacture the solar control film 100a in FIG. 1A and comprises the following steps. First, the flexible substrate 110 is flatly placed on a coating area in a coating chamber, and the coating chamber is evacuated to a vacuum having a pressure of about $2 \times 10^{-5}$ torr, for example.

Then, in step 210, a first dielectric sublayer 121 is deposited on the flexible substrate 110. For example, the first dielectric sublayer 121 may be deposited on the flexible substrate 110 by sputtering, vacuum evaporation, chemical vapor deposition (CVD), electron beam evaporation, or arc plasma coating. Additionally, the function, material, and thickness of the first dielectric sublayer 121 are as those described above, and therefore will not be described here in detail. Taking the arc plasma coating method for depositing the first dielectric sublayer 121 as an example, oxygen ($O_2$) and argon (Ar) may be introduced into the coating chamber after the pressure of the coating chamber has been reached, for example. After the preset pressure (for example, $3 \times 10^{-3}$ torr) is reached, a Ti target with a plasma power of 350 W is used for deposition to form a metal oxide (for example, $TiO_2$) on the flexible substrate 110, and the thickness of metal oxide (for example, $TiO_2$) may be 15-70 nm.

Next, in step 211, a first metal sublayer 122 is deposited on the first dielectric sublayer 121. For example, after the first dielectric sublayer 121 is deposited, the first metal sublayer 122 may be deposited on the first dielectric sublayer 121 by sputtering, vacuum evaporation, CVD, electron beam evaporation, or arc plasma coating. Additionally, the function, material, and thickness of the first metal sublayer 122 are as those described above, and therefore will not be described here in detail. Taking the sputtering method as an example, the gas flow rates of 2.5-3.5 sccm and 80 sccm may be respectively used to introduce $N_2$ and Ar to the chamber (with chamber volume of 2,700 mm×Φ2,000 mm, for example). After another preset vacuum value (for example, $2 \times 10^{-3}$ to $4 \times 10^{-3}$ torr) has been reached, a Ag—Au-alloy or Ag—Pd-alloy target (95:5 to 99.9:0.1 in weight ratio, for example) with a power of 250 W as well as a Ti target with a power of 135-150 W are used for deposition to form the first metal sublayer 122 on the first dielectric sublayer 121, for example. Consequently, the first metal sublayer 122 either containing Ag, Au, Ti, and N, or containing Ag, Pd, Ti, and N is formed. The thickness of the first metal sublayer 122 may be 10-18 nm, for example.

Subsequently, in step 212, a first protection sublayer 123 is deposited on the first metal sublayer 122. For example, after the first metal sublayer 122 is deposited, the first protection sublayer 123 may be deposited on the first metal sublayer 122 by sputtering, vacuum evaporation, CVD, electron beam evaporation, or arc plasma coating. Additionally, the function, material, and thickness of the first protection sublayer 123 are as described above, and therefore will not be described here in detail. Taking the sputtering method as an example, a Ti target with a power of 135-150 W is used for deposition to form the first protection sublayer 123 (may be such as Ti or TiN) on the first metal sublayer 122, and the thickness of the first protection sublayer 123 may be 1-3 nm, for example.

Then, in step 230a, an outer dielectric layer 140 is deposited on the first protection sublayer 123, and the manufacture of the solar control film 100a is completed. Additionally, the method of depositing the outer dielectric layer 140 on the first protection sublayer 123, and the function, material, and thickness of the outer dielectric layer 140 are as described in the corresponding examples of the first dielectric sublayer 121, and therefore will not be described here in detail.

Alternatively, according to still another embodiment of the invention, in step 240, an encapsulation layer 150 is formed on the outer dielectric layer 140. That is, the manufacture of the solar control film 100a is completed after the outer dielectric layer 140 is encapsulated by the encapsulation layer 150. Additionally, the function, material, and thickness of the encapsulation layer 150 are as those described in the corresponding examples of the flexible substrate 110, and therefore will not be described here in detail.

Figure 2B:
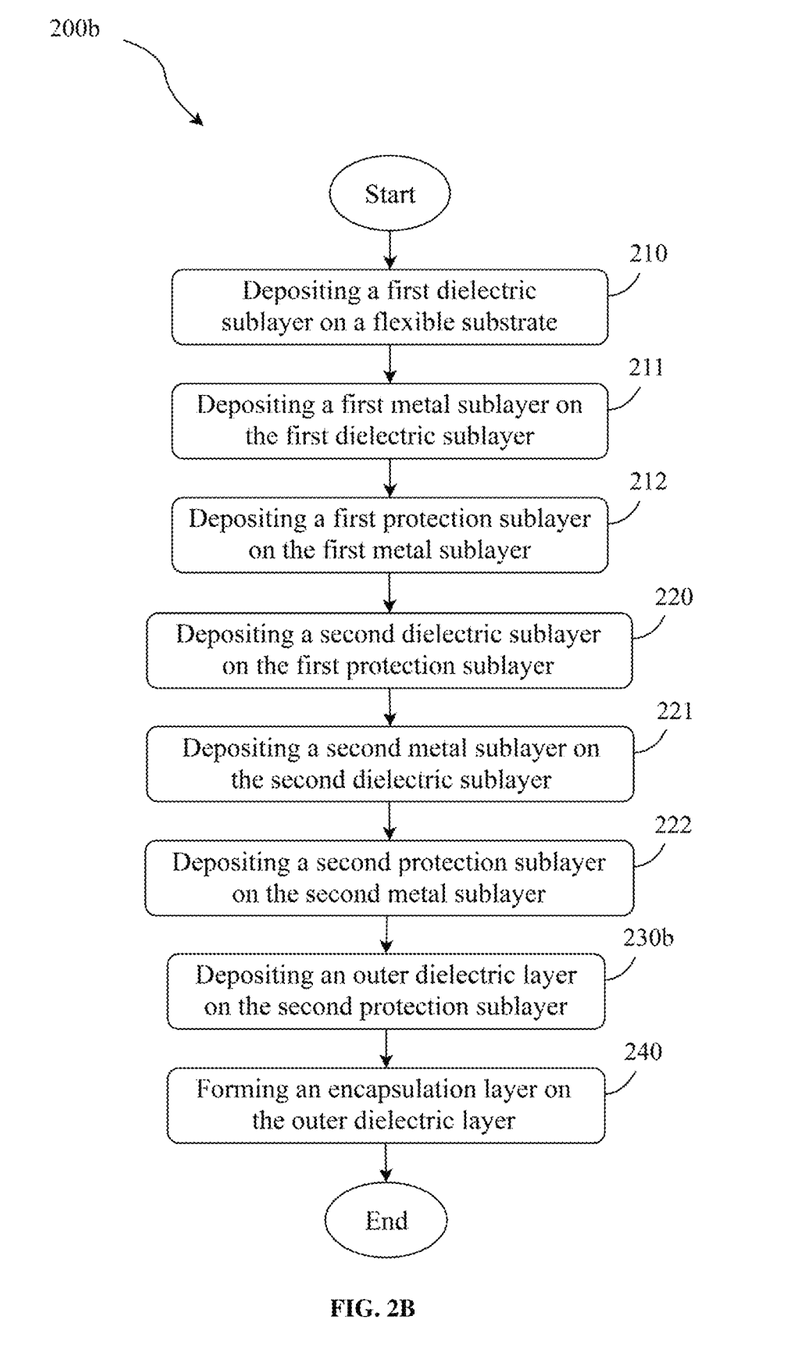
FIG. 2B is a flow chart of a method of manufacturing another solar control film according to another embodiment of the invention.

Referring to FIG. 2B, FIG. 2B is a flow chart of a method of manufacturing another solar control film according to another embodiment of the invention. Another manufacturing method 200b to manufacture a solar control film 100b as shown in FIG. 1B, according to an embodiment of the invention, is provided. The difference between the manufacturing methods 200a, 200b is that, in the manufacturing 200b, the subsequent steps following the step 212 in FIG. 2A are the steps 220-222 repeating the same as the steps 210-212 in FIG. 2A. As so, a second dielectric sublayer 131, a second metal sublayer 132, and a second protection sublayer 133 are respectively deposited. Further, in step 230b, the outer dielectric 140 can be adjusted and deposited on the second protection sublayer 133. The exemplary steps 220-222 can be the same as those described in the corresponding examples of the steps 210-212, and therefore will not be described here in detail.

[Transmittance-Reflectance Spectrum]

Figure 3A:
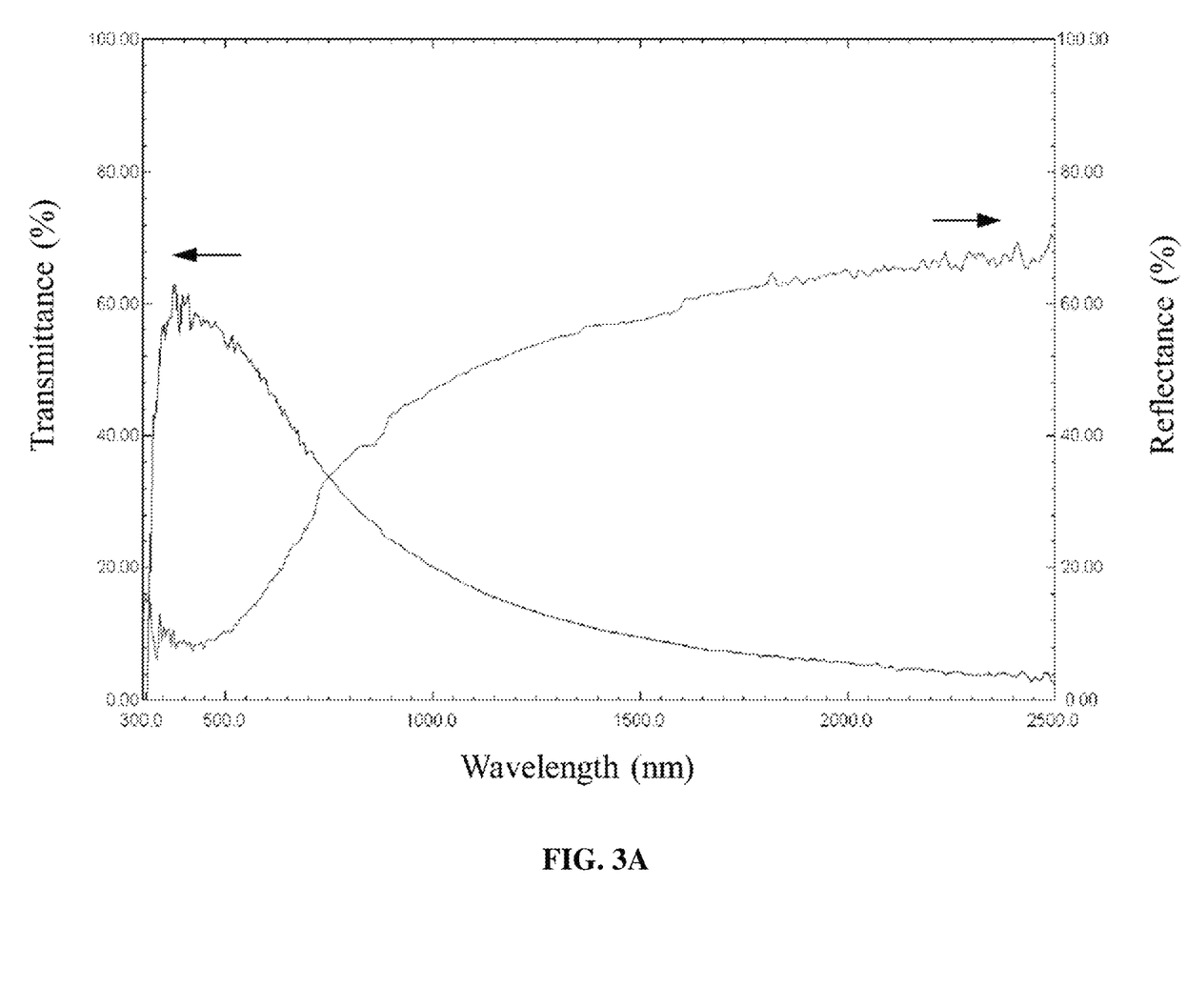
FIG. 3A is a transmittance-reflectance spectrum of a solar control film comprising only a first infrared-reflective composite layer according to an embodiment of the invention.

Referring to FIG. 3A, FIG. 3A is a transmittance-reflectance spectrum of a solar control film comprising only a first infrared-reflective composite layer according to an embodiment of the invention. In FIG. 3A, the composition of the first metal sublayer 122 of the solar control film 100a contained Ag, Pd, Ti, and N. The transmittance of the solar control film 100a in the visible wavelength range of 360-800 nm was about 55-60%, and the reflectance in the infrared wavelength range of 800-2,500 nm was 40-70%. In other words, the solar control film 100a did have the characteristics of high transparency and high infrared reflectance. And compared to the visible light transmittance (about 70%) and infrared reflectance (about 90%) of the conventional Ag-containing solar control film, the visible light transmittance and infrared reflectance of the solar control film 100a could all still maintain on competitive levels, without noticeable loss.

Figure 3B:
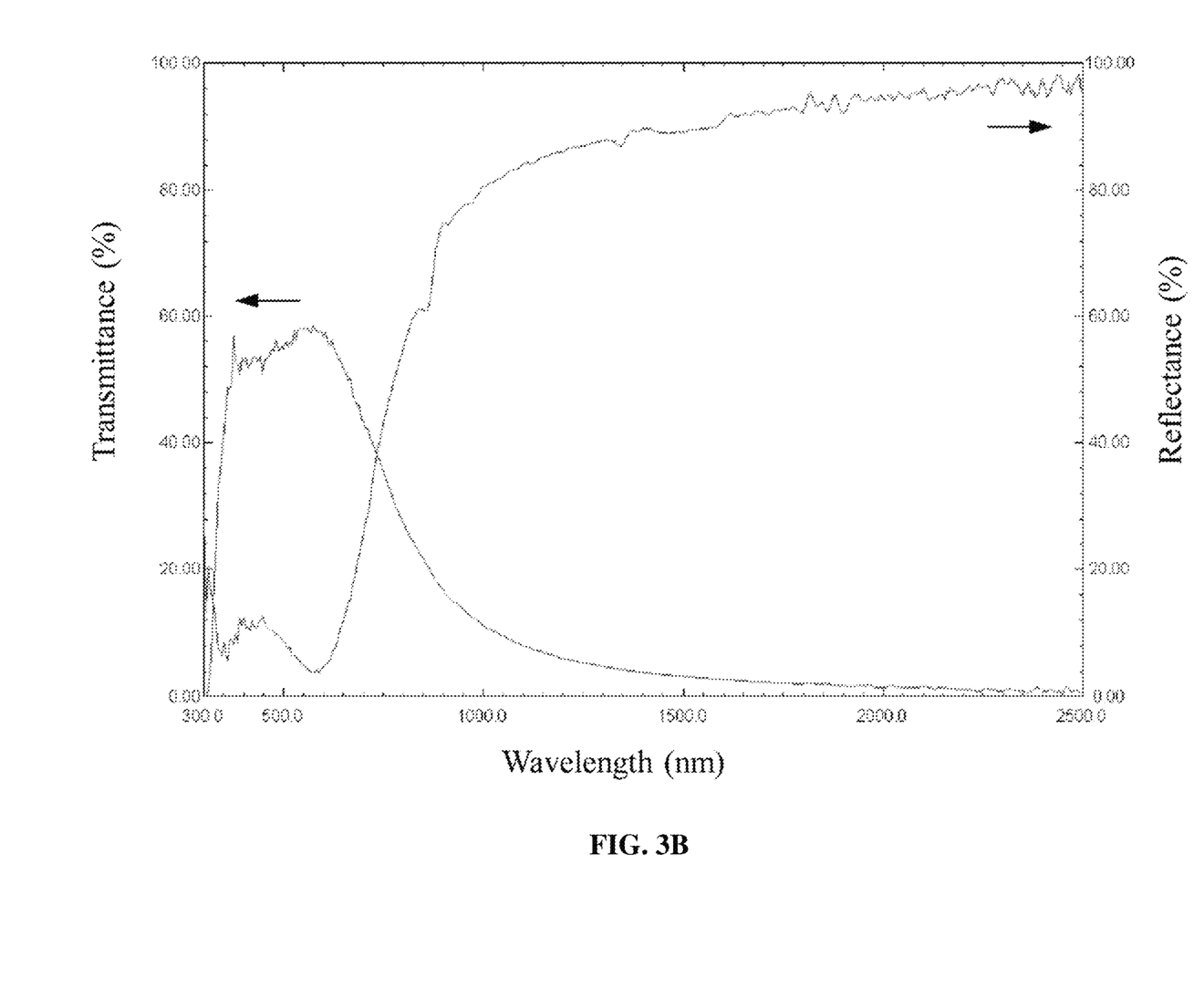
FIG. 3B is a transmittance-reflectance spectrum of another solar control film comprising a first and a second infrared-reflective composite layers according to another embodiment of the invention.
Figure 4A:
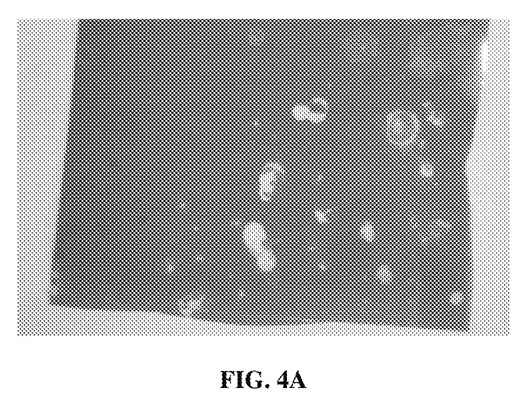
FIGS. 4A-4E are photographs of a water-drop testing result conducted on solar control films of Comparative Examples 1-4 and Experimental Example 1, respectively.
Figure 4B:
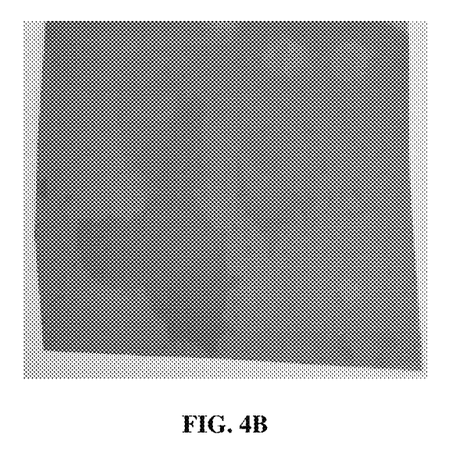
Figure 4C:
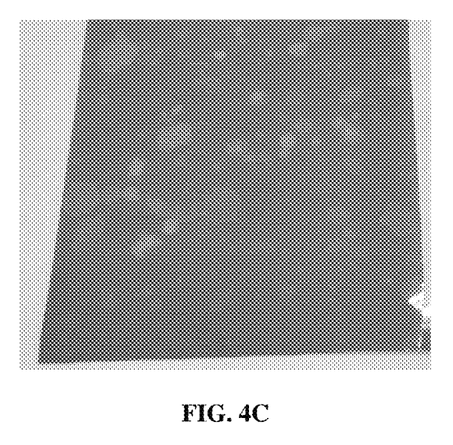
Figure 4D:
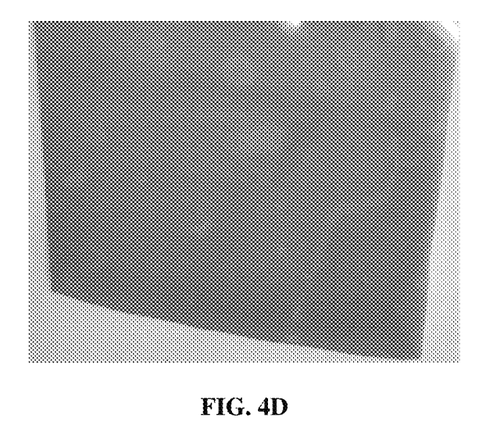
Figure 4E:
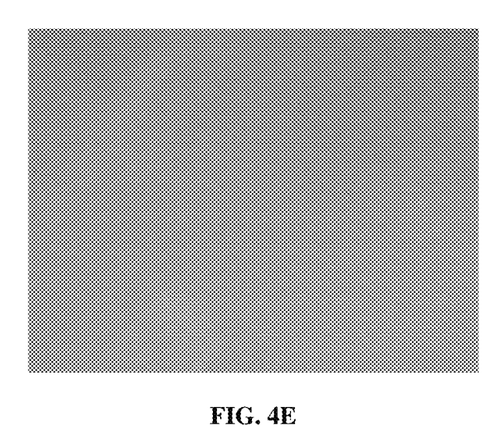
Figure 5A:
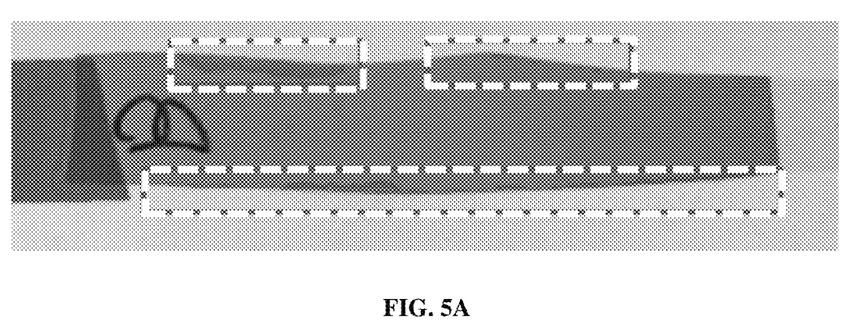
FIGS. 5A-5F are photographs of a baking experimental result conducted on a solar control films of Comparative Examples 5-7 and Experimental Example 2-4, respectively.
Figure 5B:
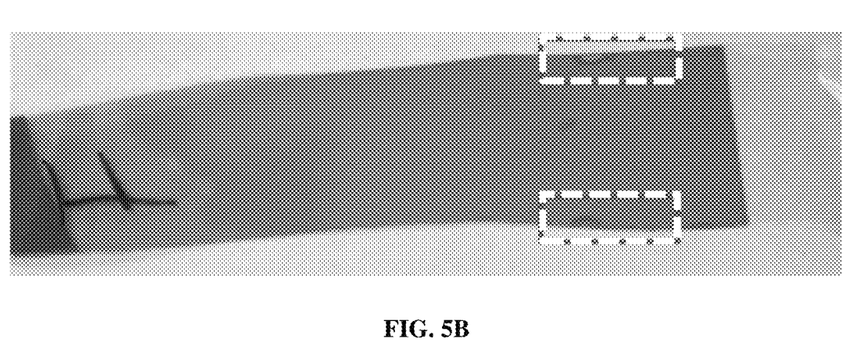
Figure 5C:
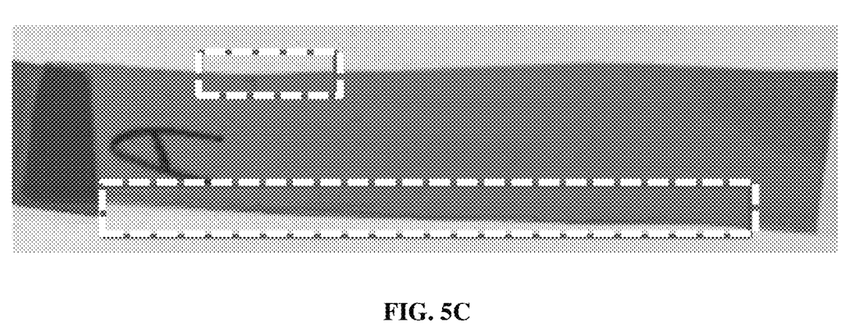
Figure 5D:
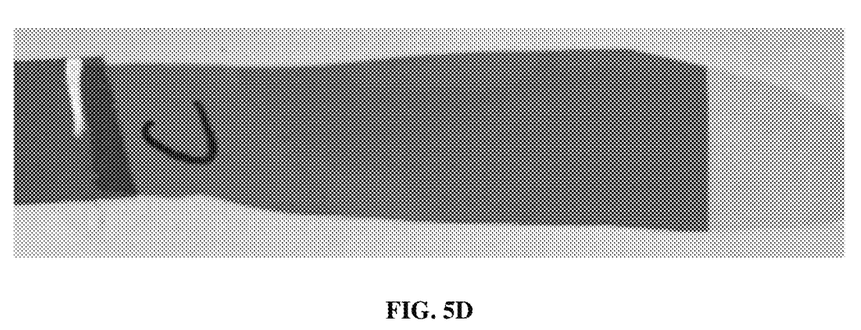
Figure 5E:
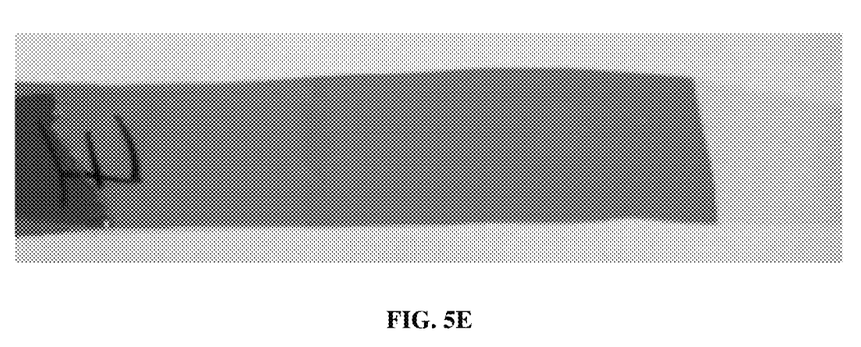
Figure 5F:
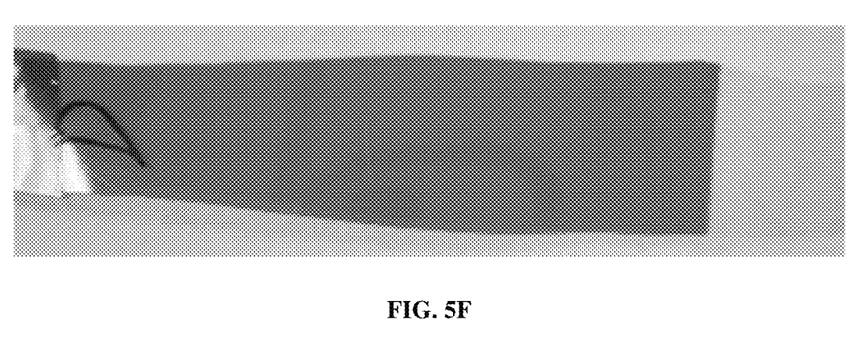

Referring to FIG. 3B, FIG. 3B is a transmittance-reflectance spectrum of another solar control film comprising a first and a second infrared-reflective composite layers according to another embodiment of the invention. In FIG. 3B, the composition of the first metal sublayer 122 and the second metal sublayer 132 of the solar control film 100b contained Ag, Pd, Ti, and N. FIG. 3B shows that when the solar control film 100b comprised the first infrared-reflective composite layer 120 and the second infrared-reflective composite layer 130, the transmittance in the visible wavelength range of 360-800 nm was about 55-60%, and the reflectance in the infrared wavelength range of 800-2,500 nm was 80-95%.

These results of the solar control film 100b were better than those of the solar control film 100a containing only the first infrared-reflective composite layer 120. In other words, the solar control film 100b also did have the characteristics of high transparency and high infrared reflectance. And compared to the visible light transmittance (about 70%) and infrared reflectance (about 90%) of the conventional Ag-containing solar control film, the visible light transmittance and infrared reflectance of the solar control film 100b could all still maintain on competitive levels, without noticeable loss.

[Water-Drop Tests]

Testing Method

The water-drop tests used here were stricter than the conventional constant-temperature and high-humidity testing method. The water-drop tests started from spraying about 6 drops (each about 0.06 mL/cm$^2$) of water droplets directly on the unencapsulated solar control film 100a, and then allowing the water droplets to directly contact the uppermost outer dielectric layer 140 (such as TiO$_2$) to observe whether white spots would be formed on the solar control film 100a or not after a time period (such as 24 hours).

The composition of Comparative Examples 1-4 and Experimental Example 1 are shown in TABLE 1 below.

Testing Results

Photographs of the white-spot forming results can be referred to FIGS. 4A-4E. FIGS. 4A-4E are photographs of a water-drop testing result conducted on solar control films of Comparative Examples 1-4 and Experimental Example 1, respectively.

Further, the white-spot forming results of the water-drop tests are summarized in TABLE 1 as below. From the following TABLE 1, the Comparative Examples 1-4 (referring to FIGS. 4A-4D, respectively) all formed the white spots, while only the Experimental Example 1 (referring to FIG. 4E) did not form the white spots and could even maintain at least four months without forming the white spots. Hence, the solar control film 100a could indeed achieve the effects of anti-oxidation, anti-humidity, and suppression of forming the white spots, and have the characteristics of better durability.

TABLE 1

White-spot forming results of the water-drop tests

| Water-drop tests | No. of FIGS. | Composition of the first metal sublayer 122 | White spots formed? |
| --- | --- | --- | --- |
| Comparative Example 1 | 4A | Ag, Ti, N | Yes |
| Comparative Example 2 | 4B | Ag, Pd | Yes |
| Comparative Example 3 | 4C | Ag, Pd, Ti | Yes |
| Comparative Example 4 | 4D | Ag, Pd, N | Yes |
| Experimental Example 1 | 4E | Ag, Pd, Ti, N | No |

[Baking Tests]

Testing Method

The baking tests used here started from, firstly, conducting the above water-drop tests on the unencapsulated solar control film 100a, and then baking the solar control film 100a by steam such as at about 100° C. for around 30 seconds to observe whether the white spots would be formed or not when the solar control film 100a was exposed to a simulated harsh environment of humidity and hotness.

The composition of Comparative Examples 5-7 and Experimental Example 2-4 are shown in TABLE 2 below.

Testing Results

Photographs of white-spot forming results after the baking tests can be referred to in FIGS. 5A-5F. FIGS. 5A-5F are photographs of a baking experimental result conducted on a solar control films of Comparative Examples 5-7 and Experimental Example 2-4, respectively.

Further, the water-drop forming results of the baking tests are summarized in TABLE 2 as below. From the following TABLE 2, the Comparative Examples 5-7 (referring to FIGS. 5A-5C) all formed the white spots, while the Experimental Examples 2-4 (referring to FIG. 5D-5F) did not form the white spots. In other words, the solar control films 100a comprising the first metal sublayer 122 containing either Ag, Au, Ti, and N (referring to FIGS. 5D-5E) or Ag, Pd, Ti, and N (referring to FIG. 5F) did not form the white spots. Therefore, the components of Au and Pd in the solar control film 100a could be replaced by each other. So no matter the first metal sublayer 122 contains Ag, Au, Ti, and N at the same time, or contains Ag, Pd, Ti, and N at the same time, the solar control film 100a could all achieve the effects of anti-oxidation, anti-humidity, and suppression of forming the white spots, and have the characteristics of better durability.

TABLE 2

Water-drop forming results of the baking tests

| Baking tests | No. of FIGS. | Composition of the first metal sublayer 122 | White spots formed? |
| --- | --- | --- | --- |
| Comparative Example 5 | 5A | Ag | Yes |

TABLE 2-continued

Water-drop forming results of the baking tests

| Baking tests | No. of FIGS. | Composition of the first metal sublayer 122 | White spots formed? |
|---|---|---|---|
| Comparative Example 6 | 5B | Ag, N | Yes |
| Comparative Example 7 | 5C | Ag, Ti, N | Yes |
| Experimental Example 2 | 5D | Ag, Pd, Ti, N | No |
| Experimental Example 3 | 5E | Ag, Pd, Ti, N | No |
| Experimental Example 4 | 5F | Ag, Au, Ti, N | No |

In summary, a solar control film and manufacturing method thereof are provided according to some embodiments of the invention. Since a first metal sublayer (and/or a second metal sublayer) of the solar control film may comprise Ag, noble metal (such as Au, Pd, or any combinations thereof), Ti, and N, it can indeed achieve the effects of anti-oxidation, anti-humidity, and suppression of forming white spots, and have the characteristics of better durability. These effects can be proved and certified by water-drop tests and baking tests. Consequently, the embodiments of the invention do solve problems of forming the white spots when exposed to a humid environment but without decreasing the visible light transmittance and infrared reflectance. Meanwhile, the solar control film according to the embodiment of the invention can also be manufactured by a lower process cost with a better durability.

The invention is only disclosed with some embodiments herein. However, anyone familiar with the technical field or skilled in the art should understand that the embodiments of the invention are only used to describe the invention, and not intended to limit the scope of patent rights claimed by the invention. Any changes or substitutions that are equivalent to the embodiments should be construed as being included within the spirit or scope of the invention. Therefore, the scope of protection of the invention shall be defined by the claims of patent application described below.

What is claimed is:

1. A solar control film, comprising:
a flexible substrate;
a first infrared-reflective composite layer, comprising:
a first dielectric sublayer disposed on the flexible substrate, wherein a material of the first dielectric sublayer comprises titanium oxide; and
a first metal sublayer disposed on the first dielectric sublayer, wherein a material of the first metal sublayer comprises 8.3-16.4 atomic % silver, 0.5-1.0 atomic % titanium, 81.0-90.9 atomic % nitrogen, and 0.3-0.6 atomic % noble metal comprising gold, palladium, or any combinations thereof; and
an outer dielectric layer disposed on the first infrared-reflective composite layer, wherein a material of the outer dielectric layer comprises titanium oxide.

2. The solar control film of claim 1, wherein the first infrared-reflective composite layer further comprises:
a first protection sublayer disposed on the first metal sublayer, wherein a material of the first protection sublayer comprises titanium, titanium nitride, aluminum-doped zinc oxide, or any combinations thereof.

3. The solar control film of claim 2, further comprising an encapsulation layer disposed on the outer dielectric layer.

4. The solar control film of claim 1, further comprising an encapsulation layer disposed on the outer dielectric layer.

5. The solar control film of claim 1, further comprising:
a second infrared-reflective composite layer, disposed on the first infrared-reflective composite layer, comprising:
a second dielectric sublayer disposed on the first infrared-reflective composite layer, wherein a material of the second dielectric sublayer comprises titanium oxide; and
a second metal sublayer disposed on the second dielectric sublayer, wherein a material of the second metal sublayer comprises 8.3-16.4 atomic % silver, 0.5-1.0 atomic % titanium, 81.0-90.9 atomic % nitrogen, and 0.3-0.6 atomic % noble metal comprising gold, palladium, or any combinations thereof.

6. The solar control film of claim 4, wherein the second infrared-reflective composite layer further comprises:
a second protection sublayer disposed on the second metal sublayer, wherein a material of the second protection sublayer comprises titanium, titanium nitride, aluminum-doped zinc oxide, or any combinations thereof.

7. The solar control film of claim 6, further comprising an encapsulation layer disposed on the outer dielectric layer.

8. The solar control film of claim 5, further comprising an encapsulation layer disposed on the outer dielectric layer.

9. A manufacture method of a solar control film, comprising the following steps:
depositing a first infrared-reflective composite layer on a flexible substrate, wherein the first infrared-reflective composite layer comprises:
a first dielectric sublayer on the flexible substrate, wherein a material of the first dielectric sublayer comprises titanium oxide; and
a first metal sublayer on the first dielectric sublayer, wherein a material of the first metal sublayer comprises 8.3-16.4 atomic % silver, 0.5-1.0 atomic % titanium, 81.0-90.9 atomic % nitrogen, and 0.3-0.6 atomic % noble metal comprising gold, palladium, or any combinations thereof; and
depositing an outer dielectric layer on the first protection sublayer, wherein a material of the outer dielectric layer comprises titanium oxide.

10. The manufacture method of claim 9, wherein the first infrared-reflective composite layer further comprises:
a first protection sublayer on the first metal sublayer, wherein a material of the first protection sublayer comprises titanium, titanium nitride, aluminum-doped zinc oxide, or any combinations thereof.

11. The manufacture method of claim 10, further comprising forming an encapsulation layer on the outer dielectric layer.

12. The manufacture method of claim 9, further comprising forming an encapsulation layer on the outer dielectric layer.

13. The manufacture method of claim 9, further comprising depositing a second infrared-reflective composite layer between the first infrared-reflective composite layer and the outer dielectric layer, wherein the second infrared-reflective composite layer comprises:
a second dielectric sublayer on the first protection sublayer, wherein a material of the second dielectric sublayer comprises titanium oxide; and
a second metal sublayer on the second dielectric sublayer, wherein a material of the second metal sublayer comprises 8.3-16.4 atomic % silver, 0.5-1.0 atomic % titanium, 81.0-90.9 atomic % nitrogen, and 0.3-0.6 atomic % noble metal comprising gold, palladium, or any combinations thereof.

14. The manufacture method of claim 13, wherein the second infrared-reflective layer further comprises a second protection sublayer on the second metal sublayer, wherein a material of the second protection sublayer comprises titanium, titanium nitride, aluminum-doped zinc oxide, or any combinations thereof.

15. The manufacture method of claim 14, further comprising forming an encapsulation layer on the outer dielectric layer.

16. The manufacture method of claim 15, wherein a material of the encapsulation layer comprises polyethylene terephthalate (PET), polyethylene naphthalate (PEN), polyether ether ketone (PEEK), or any combinations thereof.

17. The manufacture method of claim 13, further comprising forming an encapsulation layer on the outer dielectric layer.

18. The manufacture method of claim 9, wherein a material of the encapsulation layer comprises polyethylene terephthalate (PET), polyethylene naphthalate (PEN), polyether ether ketone (PEEK), or any combinations thereof.

19. The manufacture method of claim 9, wherein a material of the flexible substrate comprises polyethylene terephthalate (PET), polyethylene naphthalate (PEN), polyether ether ketone (PEEK), or any combinations thereof.

\* \* \* \* \*